Figure 1:
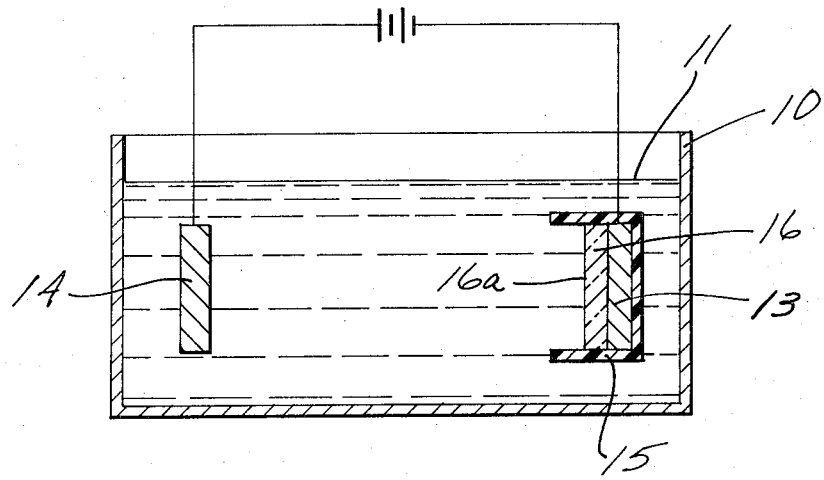

United States Patent [19]
Keyes

[11] 3,839,175
[45] Oct. 1, 1974

[54] ELECTRODEPOSITION OF ENZYMES
[75] Inventor: Melvin H. Keyes, Sylvania, Ohio
[73] Assignee: Owens-Illinois, Inc., Toledo, Ohio
[22] Filed: June 28, 1973
[21] Appl. No.: 374,762

[52] U.S. Cl. .................. 204/181, 195/63, 195/68, 204/180 R, 204/299
[51] Int. Cl. ............................................. B01k 5/02
[58] Field of Search ........ 204/180 R, 181, 299, 300; 195/63, 68

[56] References Cited
UNITED STATES PATENTS

| | | | |
|---|---|---|---|
| 892,188 | 6/1908 | Schwerin | 204/180 R |
| 1,174,903 | 3/1916 | Schwerin | 204/180 R |
| 3,758,396 | 9/1973 | Vieth et al. | 204/181 |

Primary Examiner—John H. Mack
Assistant Examiner—A. C. Prescott
Attorney, Agent, or Firm—Howard G. Bruss, Jr.; E. J. Holler

[57] ABSTRACT

Disclosed is a process for electrolytically depositing and immobilizing an enzyme by inducing electrolytic migration of the enzyme in an aqueous dispersion thereof, and intercepting the migrating enzyme on an inert, inorganic, porous, sorptive, dimensionally stable, fluid permeable supporting matrix to form a biologically active composite. Preferably, the supporting matrix is ceramic and is formed by compacting and sintering refractory oxide powders such as alumina.

10 Claims, 2 Drawing Figures

ELECTRODEPOSITION OF ENZYMES

Enzymes are biologically active proteins which catalyze specific reactions. Enzymes have been used for a wide variety of industrial and research applications, particularly in fermentation, pharmaceuticals, medical research, and food processing. They are highly specific in their biological activity and generally do not generate significant quantities of undesirable by-products.

Recently attempts have been made to chemically or physically immobilize enzymes on various supports in the interest of efficient recovery and reuse. In the past, enzymes have been immobilized by attachment to inorganic supporting matrices by covalent coupling, adsorption, and ionic bonding. Covalent coupling of enzymes to water insoluble supports has been intensively investigated. Most of the supports have been organic polymers although recent reports have appeared where coupling agents have been used to attach enzymes to ceramic materials. For instance, U.S. Pat. No. 3,519,538 describes the use of silane coupling agents to attach enzymes to inorganic supports such as glass or alumina.

Adsorption of enzymes to water insoluble supports, whether organic or inorganic, has been the simplest insolubilization technique. It has been attractive because it requires merely exposing the enzyme in solution to the support material. The ease of adsorption, however, is offset by the corresponding ease of desorption. U.S. Pat. No. 3,556,945 discloses one technique for adsorption of enzymes to porous glass supports.

Another technique involves bonding the enzyme to the support in the presence of substrate and thus apparently blocking the active sites of the enzyme to avoid reaction of these sites with the support. Powdered glass and alumina are used for these applications in U.S. Pat. No. 3,666,627.

Further details on such prior art techniques can be found in the book entitled *"Biochemical Aspects of Reactions on Solid Supports"*, edited by George R. Stark, Academic Press, New York, N.Y. (1971); the article entitled "Enzymes Immobilized on Inorganic Carriers" by H. H. Weetall appearing in RESEARCH-/DEVELOPMENT, December (1971); the article entitled *"The Potential Applications of Molecular Inclusion to Beer Processing"* by R. A. Messing appearing in the December 1971 issue of the BREWER'S DIGEST; U.S. Pat. Nos. 3,512,987 and 3,167,485.

More recently, S. S. Wang and W. R. Vieth have proposed electrically codepositing biologically active collagen-enzyme membranes in the publication entitled BIOTECHNOL. AND BIOENG. 15 at pages 93-115 (1973). A collagen dispersion containing soluble enzyme is electrodeposited and then recovered as a film.

While the discovery and the use of immobilized enzymes in membrane form has alleviated many of the disadvantages inherent in granular immobilized enzyme systems, the preparation of such membranes has heretofore been relatively time-consuming. Furthermore, such techniques are not readily adopted to the formation of shaped, integral rugged membranes for pressurized flow-through reaction cells.

A need exists, therefore, for a process of preparing biologically active, fluid permeable composite membranes in various geometrical configurations which are porous, strong and dimensionally stable so that they are capable of effecting enzyme reactions in a flow-through reaction chamber. The present invention provides such membranes.

Basically, the present invention involves preparing an aqueous dispersion of an active enzyme adjusting the pH thereof so that the enzyme becomes ionic or electrically charged and electrodepositing the enzyme onto an inert, inorganic, porous, sorptive, dimensionally stable, fluid permeable, supporting matrix to form a fluid permeable biologically active composite membrane.

Figure 2:
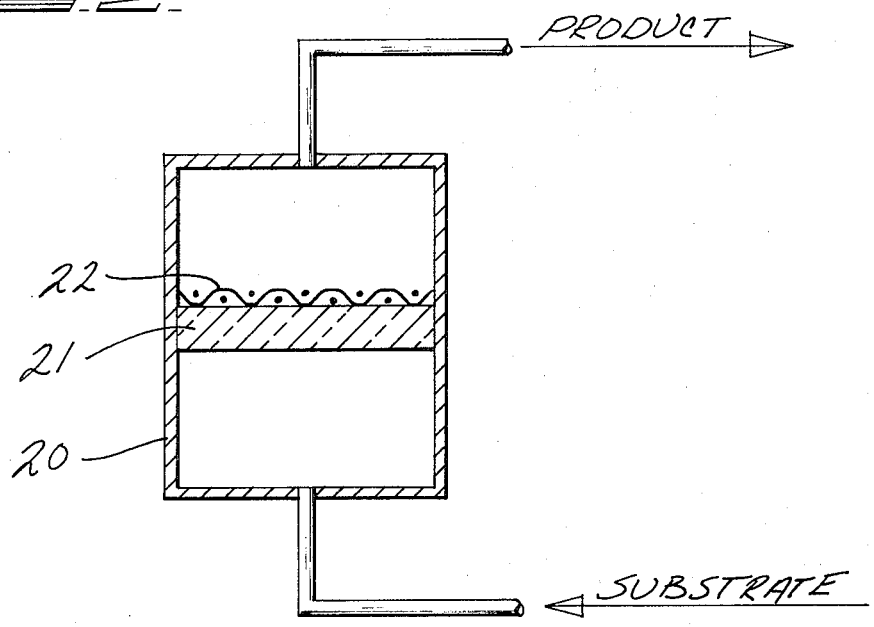

The invention will be further explained in conjunction with the drawings wherein FIG. 1 is a schematic flow diagram of an electrodeposition cell for use in preparing membranes according to the present invention, and FIG. 2 is a schematic pressure reaction cell for carrying out enzymes reactions using the membrane prepared in FIG. 1.

In carrying out the present invention, ionic enzyme species in an aqueous dispersion are immobilized on an inert, porous, inorganic, fluid permeable, dimensionally stable, supporting matrix. The driving force for this deposition is provided by the application of a potential difference between two electrodes immersed in the ionized enzyme dispersion with the porous matrix interposed in the electrical path between the electrodes so that it impedes the migration of ionic enzyme species to an oppositely charged electrode.

One electrolytic cell which meets this requirement is to use the porous matrix as a divider between two halves of an electrolytic cell with enzyme dispersion on one side and an identical non-enzyme containing dispersion on the other such that solvent and dissolved salts and any acid or base present can freely pass through the matrix, but enzyme flow will be inhibited and enzyme thereby deposited on the matrix. A variety of other cells can be employed for accomplishing the desired electrodeposition.

A particularly useful apparatus for the electrodeposition technique of this invention is a modified (i.e., modified to include a porous matrix positioned in the electrical path between the electrodes) electrophoretic mass-transport analyzer, the fundamentals of which are described by Sennett and Olivier in *ENGINEERING CHEMISTRY* (Vol. 57, Aug. 1965, pp. 32-50) and in U.S. Pat. No. 3,208,919.

Enzymes are complex polypeptides and have amino and carboxyl functionality in their molecular structure. Such amino and carboxyl groups are capable of causing electrical migration to the enzymes in aqueous dispersion thereof. Enzymes migrating under the influence of the carboxyl migrate to the anode, while enzymes migrating under the influence of the amino groups go toward the cathode.

Any enzyme capable of carrying electrical charge in aqueous dispersion can be used, including a wide variety of enzymes which may be classified under three general headings: hydrolytic enzymes, redox enzymes, and transferase enzymes. The first group, hydrolytic enzymes, include proteolytic enzymes which hydrolyze proteins, e.g., papain, ficin, pepsin, trypsin, chymotrypsin, bromelin, keratinase, carbohydrases which hydrolyze carbohydrates, e.g., cellulase, amylase, maltase, pectinase, chitanase; esterases which hydrolyze esters, e.g., lipase, cholinesterase, lecithinase, alkaline and acid phosphatases; nucleases which hydrolyze nucleic acid, e.g., ribonuclease, desoxyribonuclease; and amidases which hydrolyze amines, e.g., arginase, asparaginase, glutaminase, histidase, and urease. The second group are redox enzymes that catalyze oxidation or reduction reactions. These include glucose oxidase, xanthine oxidase, catalase, peroxidase, lipoxidase, and cytochrome reductase. In the third group are transferase enzymes that transfer groups from one molecule to another. Examples of these are glutamicpyruvic transaminase, glutamic-oxalacetic transaminase, transmethylase, phosphopyruvic transphosphorylase. It should be noted that the enzyme can be used alone or in combination with other enzymes.

In that an enzyme is a protein, it has a net electrical charge at a pH on either side of its isoelectric point and will migrate under the influence of an electric field. In that some enzymes may be rather impure, it is not known whether they all form true solutions in water. Accordingly, the term dispersion is used to include solutions, suspension and emulsions of enzymes that are capable of electrically migrating.

The composition of the inorganic supporting matrix is not particularly critical as long as it is inert, dimensionally stable, and sufficiently porous to be fluid permeable and sorptive enough to retain enough enzyme to form a biologically active composite membrane. In the commercially significant embodiments of the present invention, the biologically active composite membrane will exhibit at least about 0.001 International Units (I.U.) of activity per cubic centimeter of membrane.

An International Unit of biological activity has been defined as the amount of active enzyme which converts substrate to product at the rate of one micromole per minute.

It has been found that porous matrix having a volume porosity in the range of 10 percent to 80 percent and preferably in the range of 15–50 percent are quite suitable for the present purposes. The pore size of the support is critical in that it should not be so small as to prevent immobilization of the electrolytically migrating enzyme thereon or inhibit fluid permeability in the resulting biologically active membrane. Average pore size diameters in the range of 0.01 micron to 10 microns are suitable for most applications with 0.01 to 2 being preferred for efficiency and economy.

The porous support can be formed by compacting and sintering refractory ceramic oxide powders such as alumina powder, zirconia powder, magnesia powder, silica powder, thoria powder, glass powder, powdered clay, powdered talc and the like.

Porous, inert, rigid, dimensionally stable refractory supports can be prepared by compacting such refractory oxide powders to form a "green compact" of the desired configuration. The green compacts are then fired for a time and at a temperature sufficient for sintering to yield porous, inert, rigid, dimensionally stable, fluid permeable refractory support. The sintering should not be at a temperature or for a time which would cause collapsing or coalescence of the particles to form a non-porous body. A convenient indication of the degree of sintering is a comparison of the actual density of the fired compact as compared to the theoretical density of the oxide being fired. Of the many oxides which can be used for the present purposes, alumina is preferred for its chemical durability and ease of fabrication.

In forming the support from the powdered refractory oxide, the powdered particle size is selected to yield a sintered compact having a porosity and pore size in the range set forth above. The techniques for compaction and sintering of the porous supports are well-known in the art and form no part of the present invention. Suffice it to say that compacting pressures in the range of 1,000 p.s.i. to 10,000 p.s.i. and sintering temperatures in the range of 1,300° to 1,700°C. are commercially expedient. Additional details on compacting and sintering of refractory oxides can be obtained from the book "Oxide Ceramics" by E. Ryshkewitch, published in 1960 by Academic Press, New York, N.Y.

The porous supporting matrix can also be in the form of porous 96 percent silica glass such as is disclosed in the article entitled "*Properties of Some VYCOR-Brand Glasses*" by M. E. Nordberg appearing at page 299 in Volume 27, No. 10 of the Journal of the American Ceramic Society (1944). Other such porous glasses are disclosed in U.S. Pat. Nos. 2,215,039 and 3,556,945, the disclosure of which are incorporated by reference.

The porous matrix can also be made of porous metal such as porous silver or porous stainless steel.

The porous matrix can be in any geometric shape such as rod cylinder discs, plates, bars, and blocks so long as it can be interposed in the electrical path between the electrodes in the deposition circuit as will be described below.

In the electrodeposition of enzyme, a dilute aqueous dispersion of enzyme is employed. The amount of enzyme to be added to the aqueous dispersion will depend upon the area of the matrix support to be electrically deposited, the degree of activity desired in the final membrane, the activity of the enzyme preparation being used, and the particular enzyme material being used. Usually, enzyme concentrations in the range of 1 $\times 10^{-5}$ to 10 percent by weight of the aqueous dispersion are suitable. The optimal amount for a given system can be readily determined, because the use of too little enzyme will result in a membrane of low activity, while the use of an excessive amount of enzyme is economically wasteful.

Any electrically conductive material such as metal or carbon can be used as the anodes and cathodes. Suitable metals include iron, stainless steel, zinc, copper, gold, silver, platinum, aluminum, nickel, or other biochemically inert metals or alloys thereof; a noble metal plated on a base metal; graphite or other electroconductive powders, such as graphite shaped with a binder (e.g., paraffin, synthetic resin, or the like).

The aqueous dispersion of enzyme is adjusted to a pH at which the enzyme become charged or ionic at the molecular or colloidal levels. Accordingly, the pH can be adjusted to either side of the range of isoelectric point of the enzyme to be deposited. This is easily accomplished merely by the addition of buffers, acids or bases to bring the solution to a pH either above or below the isoelectric point. The concentration of electrolytic impurities in the aqueous dispersion is preferably kept low, because the presence of a high concentration of electrolytes causes excessive current flow which heats the solution and may adversely affect the activity of the resulting membrane.

The aqueous mixture is then introduced into an electrodeposition cell which is provided with at least one cathode and at least one anode. One of these electrodes may be the vessel itself, or separate electrodes can be used. In the former case, of course, the electrodeposition vessel will be conductive, such as a stainless steel flask or the like.

An electrical potential is then applied between the two electrodes to deposit the membrane on the support. Voltage and current requirements are dependent upon the dimensional parameters of a given cell, such as the area of the matrix to be coated, the distance between electrodes, the temperature, and the concentration of materials and electrolytes in the aqueous mixture. Generally, it is preferabe to use a relatively low voltage supply, such as from about 10 to 600 volts. The actual current requirements are quite small, generally less than one ampere for small membrane. Working at low current flow avoids an undesirable increase in temperature, which may denature the enzyme. Voltages for a given application can be readily determined by simple experimentation.

Temperatures are not critical as long as the temperature is kept above the freezing point of the enzyme dispersion, and below a temperature at which the enzyme will become thermally denatured. Generally, temperatures between 0° to 50°C. are satisfactory with room temperature being a convenient working temperature.

The time required for immobilizing enzyme on the matrix will vary according to the concentration of enzyme, the surface area of the matrix being deposited, the temperature, and the current being applied. Usually, time periods ranging from 5 minutes to an hour are satisfactory.

Referring now to FIG. 1, cell 10 contains a bath 11 of aqueous dispersion of ionized enzyme. Immersed in bath 11 are electrodes 13 and 14 which can be made of metal. Electrodes 13 and 14 are connected to a source of direct current potential which can be a battery, rectified alternating current or other electric power supply which provides a net D.C. potential. One such power supply can deliver voltages up to 600 volts and a current in the fractional amp range at load resistances of up to 1 mega-ohm.

Immediately adjacent electrode 13 is mounted the inert, inorganic, porous, sorptive, dimensionally stable, fluid permeable, supporting matrix 16, the dimensions of which are co-extensive with the confronting dimensions of the electrode 13. The assembly of the electrode 13 and matrix 16 are mounted in housing 15. Housing 15 envelops electrode 13 and matrix 16 so that only face 16a of the matrix 16 is exposed to bath 11. Thus, it is seen that matrix 16 is interposed in the electrical path defined between electrodes 13 and 14.

In some practices of the present invention, it may be desired to adapt housing 15 for rotation or vibration to minimize the detrimental effects of concentration polarization normally associated with electrode reactions.

When the electrical circuit is completed in the illustration of FIG. 1, the ionic enzyme species migrate towards electrode 13 and are intercepted and immobilized on matrix 16 to form the biologically active composite membrane.

The porous supporting matrix 16 is wetted on the electrode side with the enzyme solution before mounting with electrode 13 in housing 15 to insure electrical content. It is important that a good edge seal be provided between electrode 16 and housing 15 to prevent enzyme from flowing around the matrix rather than onto the face 16a of the matrix.

The electrode 13 in direct contact with the matrix 16 is made an anode or cathode such that charged enzyme molecules will move toward it under the electric field. That is, a charge is applied to this electrode which is opposite that on the enzyme. Sufficient D.C. voltage is applied to the cell to maintain current flow. Currents of 0.10 to 6. milliamps for 5 minutes to an hour are typical.

For some enzymes, particularly those with isoelectric points near pH 7, it is possible to impart a positive or negative charge to the enzyme by adjustment of the pH without denaturing the enzyme. In this case the electrode 13 would be made negatively or positively charged respectively. Under some circumstances, a trial-and-error procedure may be necessary to establish the optimum set of conditions for a given enzyme, especially if the isoelectric point of the enzyme is unknown.

If the enzyme is only stable in a pH range which is above its isoelectric point, then a positively charged matrix electrode can be employed. A negative matrix electrode can be used if the converse is true. Thus, this invention is not restricted to just those enzymes having stability in a specific narrow pH range.

The enzyme reaction using the biologically active composite membrane is carried out in a conventional pressure reaction cell 20 as shown in FIG. 2. The particular cell employed in the examples that follow is an Amicon Model 420 high-pressure ultrafiltration cell in which the ultrafiltration membrane has been replaced by the biologically active composite membrane 21 prepared according to FIG. 1. Membrane 21 is sealed into cell 20 to prevent leakage at the interface therebetween. This membrane is designated by Number 21. Membrane 21 is supported by inert grid 22 in the form of a stainless steel screen so that the membrane will not be dislodged by the pressure in the cell.

In the Examples that follow, all parts are parts by weight, all percentages are weight percent and all temperatures are in °C. unless stated otherwise.

EXAMPLE 1

PART A

Preparation of the Support Matrix

Porous supporting matrices in the form of discs are prepared from a fine alumina powder having an average particle diameter of about 1 micron. (Such alumina powder is available from Alcoa under the designation of "A-16".) A compaction mixture is formed by ball-milling 3 percent polyvinyl alcohol, 1/2 percent stearic acid, 25% $H_2O$, with the balance being alumina powder. The polyvinyl alcohol and the stearic acid serve as compaction aids. The milled powder is dried at 150°C. under vacuum.

The dried alumina powder is then compacted in a ram press into discs of three-fourths inch in diameter and 55 mils thickness under 6,000 p.s.i. The discs weigh about 1 to 1.5 grams each.

The discs are sintered by heating gradually to 1,500°C. and then maintaining this temperature for 2 hours. The discs are then allowed to cool to room temperature over several hours.

The resulting discs are porous, fluid permeable, rigid, dimensionally stable, and sorptive. Supporting matrices can also be formed in this manner from refractory materials, powdered titania, powdered zirconia, powdered thoria, powdered glass, and fine clay.

The faces of the resulting sintered discs are then ground so that they are substantially flat and parallel.

The resulting discs have a porosity of about 20 to 30 percent with an average pore diameter of about 0.1 micron.

Because of the chemical and thermal stability of the alumina support matrix it can be reconditioned for re-use, if desired, after the immobilized enzyme has finally lost most of its activity. It is necessary only to place the disc in a furnace and heat at 800°C. for 2 hours. This serves to remove enzyme and other entrapped residual organic materials as well as to dehydrate and reactivate the surface of the alumina. Thus, a single alumina support can be used repeatedly.

PART B

Electrodeposition of Enzyme

An electrodeposition cell like the one shown in FIG. 1 is filled with an electrodeposition bath comprising 120 ml of a 0.1 percent by weight aqueous dispersion of ribonuclease. The pH of the solution is adjusted to 7 with sodium hydroxide. The activity of the enzyme is 1.1 International Units (I.U.) per mg, one unit being equivalent to the amount of RNase required to convert one micromole/minute of cytidine 2',3'-cyclic monophosphoric acid to cytidine 3' monophosphoric acid.

One of the porous alumina discs prepared in Part A is mounted in the cell as matrix 16 and electrodes 13 and 14 are in the form of zinc discs of the same size as the alumina discs. Electrode 13 is made the cathode of the cell. A D.C. voltage is applied to initiate a current of 1.0 ma between the electrodes. The voltage is gradually lowered over a 30-minute deposition period so that the final current is 0.1 ma to prevent overheating of the bath. No external heating or cooling is employed. During the 30-minute deposition period, housing 15 is rotated at the rate of 30 r.p.m. by means not shown in the drawings. At the end of this deposition period, ribonuclease has been electrodeposited and immobilized in an active form on the porous, alumina matrix to form the fluid permeable, rigid, dimensionally stable biologically active composite membrane.

The substrate solution is prepared by dissolving 150 mg of cytidine 2',3'-cyclic monophosphoric acid in 150 ml of water. A 0.02 sodium acetate buffer solution is used to adjust the pH to 5.0. The substrate is placed in reaction cell 20 as shown in FIG. 2 and a pressure of 300 psi is applied to the substrate solution with nitrogen gas from a high pressure cylinder to force the substrate solution to flow through the biologically active composite membrane 21.

At a flow rate of 0.08 ml/min, 69 percent of the substrate is converted to product, (i.e., cytidine 3' monophosphoric acid), as determined from the increase in optical density of the product solution at 290 nm. Similar results are obtained when the porous matrix in the above procedures is compacted and sintered from powdered zirconia, powdered titania, or powdered glass into discs having a porosity of 30 percent and an average pore diameter of 0.2 microns.

For purposes of comparison a similar porous alumina disc is placed in the electrodeposition bath described above and allowed to adsorb enzyme under static conditions for several hours. Using identical assay techniques this disc is able to convert only 15 percent of the substrate to the product.

Procedure for Determining Enzyme Activity

It is known that the flow rate of substrate solution passing through a column of particles containing immobilized enzyme has a definite effect on the percent conversion that is obtained. The rate or velocity of the substrate conversion has also been found to be dependent upon the flow rate through a porous support matrix containing immobilized enzymes. Therefore, to reduce the complexity of the system and calculate a flow rate-independent initial velocity, the procedure now to be described is employed in the Examples.

The activity in International Units of the enzyme immobilized on the biologically active composite membrane is determined from the equation $$I.U. = \frac{\Delta C}{\frac{1}{Q}}$$

where I.U. is activity in micromoles of substrate converted per minute in the flow through reactor of FIG. 2 at steady state conditions. $C$ is concentration of substrate in micromoles per liter. $\Delta C$ is the change in concentration of substrate upon flowing through the membrane. $Q$ is flow rate through the membrane in liter per minute. In the Examples 2 through 8, the I.U. are determined as the slope of a line passing through the origin and coincident with the straight line portion of the plot obtained by plotting $\Delta C$ versus $1/Q$.

The substrate concentration changes are determined spectrophotometrically from UV absorption measurements in the usual manner at the appropriate wave length for the specific enzyme under consideration except for examples involving urease where the formation of ammonium ions is measured by a cation electrode.

EXAMPLE 2

PART A

Electrodeposition of Enzyme

A 0.0257 percent by weight dispersion of chymotrypsin is prepared from enzyme material having an activity of 45 I.U./mg, based on benzoyltyrosine ethyl ester (BTEE) conversion. The pH of the aqueous dispersion is 6.0.

The electrodeposition cell is filled with 120 ml of this dispersion and a porous alumina disc having an average pore diameter of 0.1 microns and 20 percent porosity (i.e., free volume) which has been prepared as in Part A of Example 1, is mounted in the cell as described above with electrode 13 being connected as the cathode.

A D.C. voltage is applied to initiate electrodeposition and a current of 6 ma is observed. These conditions are maintained for 15 minutes to form the biologically active composite membrane.

PART B

Use of Electrodeposited Membrane

The activity of the membrane prepared in Part A is assayed in the pressure cell as in Example 1 using a BTEE solution at pH 5 as described by B. C. Hummel in Volume 37 of the Canadian Journal of Biochem. Physiol. at page 1393 (1959).

The pressure applied to the reaction cell is varied from 200 up to 1,000 psi to provide several different flow rates to use in the calculation of enzyme activity. The increase in optical density at 256 nm is used to monitor the formation of reaction product.

This analysis gives an activity of 0.1 I.U. of chymotrypsin for the biologically active composite membrane. The membrane is stored for 3 weeks in the same buffer solution as used in the assay. The activity is then measured again and found to be 30 percent of the original value (i.e., 0.03 I.U. of chymotrypsin). No further decrease in activity is observed after an additional three-week storage.

EXAMPLE 3

A 0.01 percent by weight aqueous dispersion of chymotrypsin is prepared as in Example 2 and the pH adjusted to 7.2 with phosphate buffer having a pH of 8. The electrodeposition cell is filled with 120 ml of this dispersion and a porous alumina disc, which has been prepared as in Part A of Example 1, having an average pore diameter of 0.09 micron and porosity of 21 percent is used as in Example 1. Six milliamps of current flow for 30 minutes with the electrode 13 being connected to the cathode to form the biologically active membrane.

When assayed as in Example 2, the membrane is found to have an activity of 0.029 I.U. After storing one week in the buffer solution used for the assay, the disc is reassayed under the same conditions. The activity had decreased to 50 percent of its original value.

EXAMPLE 4

An aqueous 0.01 percent by weight chymotrypsin dispersion is prepared as in Example 2. The pH is adjusted to 6.3 with a 0.08 THAM [tris(hydroxymethyl) aminomethane] buffer solution (pH 7.8) containing 0.1 M calcium chloride.

The porous alumina disc employed as the matrix which has been prepared as in Part A of Example 1 has an average pore diameter of 0.08 microns and a porosity of 20 percent. The electrodeposition is carried out at a current of six milliamps for 15 minutes with the electrode arrangement as in Example 1 to form the biologically active composite membrane.

The initial activity of the membrane is too great to be measured with BTEE substrate as in Example 2. The activity is too high to be obtained after 1 week.

An alternate substrate, N-benzoyl-L-histidine methyl ester, is employed three weeks after preparation. This is a "poorer" substrate for chymotrypsin; that is, chymotrypsin does not convert this substrate to product as easily as it does BTEE. The activity of chymotrypsin with respect to N-benzoyl-L-histidine methyl ester is determined as described above by measuring the varying rates of flow of this substrate solution through a pressure cell and monitoring the corresponding changes in optical density of the solution at 270 nm. An activity is calculated to be the equivalent of 90 I.U. of BTEE. Five weeks after preparation the membrane is assayed again with BTEE and found to have an activity of 0.17 I.U. This activity of 0.17 I.U. is determined from the following data.

| $\Delta C$ in micromoles/liter | Q in liter/minute | 1/Q |
|---|---|---|
| 2.85 | 0.30 $\times 10^{-3}$ | 33.33 |
| 2.01 | 0.65 do. | 15.39 |

-Continued

| $\Delta C$ in micromoles/liter | Q in liter/minute | 1/Q |
|---|---|---|
| 1.50 | 0.95 do. | 10.53 |
| 1.24 | 1.20 do. | 8.33 |

As a control, an alumina disc with average pore size of 0.15 $\mu$ is placed in the above 0.01 percent chymotrypsin dispersion for one-half hour. After adsorption for one-half hour the disc is washed thoroughly with the THAM buffer mentioned above and stored at 2°–5°C. The activity, as measured in the same way as described for the chymotrypsin membranes prepared by electrodeposition, is the equivalent of 0.01 I.U. of soluble chymotrypsin with respect BTEE. Nine days after preparation no activity could be detected on the disc.

The enhanced activity of the membrane toward BTEE in this example as compared to Examples 2 and 3 must be attributable to the presence of calcium ion in the enzyme (chymotrypsin) solution used for Example 4. Similar beneficial effects of calcium ion have been noted for conversion of BTEE in solution phase with the enzyme chymotrypsin by S. P. Colowich and N. O. Caplan as reported in Methods in Enzymology Volume II, pages 8–26, Academic Press, Inc., New York, N.Y. (1955).

EXAMPLE 5

An aqueous 0.001 percent by weight chymotrypsin dispersion is prepared as in Example 2. The pH is adjusted to 6.4 with a THAM buffer solution containing 0.1 M calcium chloride.

The porous alumina disc used as the matrix, which has been prepared as in Part A of Example 1, has an average pore diameter of 0.10 micron and a porosity of about 30 percent. The electrodeposition is carried out at a current of 6 milliamps for 30 minutes with electrode 13 negatively charged.

The activity of the immobilized enzyme is assayed with BTEE as described in Example 2. The initial activity for the disc is 0.02 I.U. This activity remained constant for 3 months.

EXAMPLE 6

PART A

A 6.67 $\times 10^{-4}$ percent by weight xanthine oxidase dispersion is prepared by dissolving the enzyme (activity 0.5 I.U./mg) in distilled water containing sodium salicylate (9 $\times 10^{-4}$M). The pH is 8.1.

The porous alumina disc used as the matrix has an average pore diameter of 0.11 microns and a porosity of about 25 percent. The electrodeposition is carried out as in Example 2 with electrode 13 being the cathode with a current flow of 6 milliamps for 30 minutes to form the biologically active composite membrane.

The initial activity of the membrane is determined as described above. A 1.0 $\times 10^{-4}$M xanthine substrate solution is prepared in a buffer system of 0.1M pyrophosphate and 3 $\times 10^{-4}$M ethylenediamine tetracetic acid. The pH of the enzyme dispersion is 8.3. The conversion of xanthine to a reaction mixture containing allantoin, urea, uric acid, and $CO_2$ is measured from optical density changes at 295 nm as a function of the decrease in concentration of xanthine. The initial activity of the membrane is 2.8 $\times 10^{-3}$ I.U. After storing the membrane for 6 weeks in the buffer solution used for the assay the disc is slightly more active ($3.3 \times 10^{-3}$ I.U.).

PART B

The same xanthine oxidase dispersion described in Part A of Example 6 is used as the electrodeposition bath. The porous alumina disc used as the matrix has an average pore diameter of 0.15 micron and a free volume of 31 percent. The same electrodeposition method is employed except that electrode 13 made the anode. A current of 6 milliamps is allowed to flow for 30 minutes to form the biologically active composite membrane.

The membrane is assayed as in Part A of Example 6 and found to have activity of $8 \times 10^{-3}$ I.U. After 6 weeks of storage, the activity of the membrane is $3 \times 10^{-3}$ I.U.

The foregoing examples illustrate how to carry out electrodeposition with both cathodic and anodic deposition when the isoelectric point of the enzyme is unknown. The specific results in Part A and Part B indicate that at pH 8.1 the xanthine oxidase has more of a tendency to migrate to the anode.

EXAMPLE 7

PART A

A histidase dispersion is prepared by first dissolving histidase enzyme (activity 4.8 I.U./mg) in 10 ml of distilled water and centrifuging at 1,000 g (gravity forces) for 5 minutes. Next, the supernatant is added to 5 ml of a 0.1M solution of 2-amino-2-methyl-1,3- propanediol (AMPD) and 1.5 ml of a 0.01 M solution of dithiothrietol. This combined solution at pH 9.2 is diluted to a total volume of 150 ml to give a $6.67 \times 10^{-3}$ percent by weight histidase solution which is $3.3 \times 10^{-3}$M in AMPD and $1.0 \times 10^{-4}$M in dithiothrietol.

A porous alumina disc used as the matrix has an average pore diameter of about 0.12 microns and a porosity of 30 percent. Electrodeposition is carried out as in Example 2 with a current flow of 6 milliamps for 30 minutes and the electrode 13 being the anode to form the biologically active composite membrane.

The activity of the membrane is assayed as in Example 3 using a substrate solution of $4 \times 10^{-3}$M histidine in 0.01M AMPD and $1.0 \times 10^{-4}$M dithiothrietol. The pH of the solution is 9.2. The activity of the membrane four days after preparation is 2.2 I.U., while 3 weeks later the activity was $5.5 \times 10^{-4}$ I.U. Between measurements the membranes are stored in the same buffer solution used for the assay.

PART B

A second electrodeposition and assay of histidine is carried out as in Part A except that electrode 13 is the cathode. No enzymatic activity could be detected on the membrane. Thus, at pH 9.2 the enzyme histidase apparently carries a negative charge and migrates toward the anode.

EXAMPLE 8

PART A

An approximately 0.001 percent by weight aqueous urease (25 I.U./mg) dispersion is prepared by dissolving urease enzyme in distilled water, the pH of which had been adjusted to 6.9 with 0.01M triethanolamine. The porous alumina disc used as the matrix has an average pore diameter of 0.12 micron and a porosity of about 30 percent. The electrodeposition procedure is carried out as in Example 2 with a current of 4 milliamps for 45 minutes. Electrode 13 is connected as the cathode in forming the biologically active composite membrane.

The activity of the membrane is measured at pH 6.7 using a substrate solution of 0.05M urea which was 0.01 molar in triethanolamine. The conversion of urea to ammonia is followed by the use of an ammonium ion specific electrode, the treatment of the data being the same as in Example 2. The first activity measurements are made 3 days after the electrodeposition experiment. Initial urease activity for the membrane is 0.38 I.U. After storing one month in 0.01M triethanolamine the membrane is reassayed and the activity is observed to have decreased to 0.09 I.U. Seven weeks after preparation an activity of 0.05 I.U. is measured.

PART B

The enzyme solution is prepared as in Example 8, Part A, and the electrodeposition also carried out in the same manner as described therein with the exception that the electrode 13 is connected as the anode.

Assay of the membrane with the same substrate solution and procedure as in Part A gives a value of 4.9 I.U. of urease. After storing for 5 weeks in 0.01M triethanolamine, the disc is reassayed and shown to have an activity of 0.12 I.U.

The large difference in activity for the freshly prepared membranes in Part A and Part B is readily explained by the fact that at pH 6.9 the urease (isoelectric point 5.1) is negatively charged. The electrode 13 in Part A is negatively charged, the same as the enzyme, while the electrode 13 in Part B is positively or oppositely charged to the enzyme.

Having thus described the invention, what is claimed is:

1. In the process for depositing and immobilizing an enzyme on an inert, inorganic, porous, sorptive, dimensionally stable, fluid permeable, supporting matrix, the improvement comprising;

immersing a pair of electrodes comprising an anode and a cathode in an aqueous dispersion of said enzyme to define a path for electrical communication through said dispersion between said electrodes, interposing said matrix in said path, establishing net DC potential gradient between said electrodes, said gradient being of a magnitude sufficient to induce electrolytic migration of enzyme towards one of said electrodes, intercepting the migrating enzyme on said matrix, maintaining said potential gradient for a time sufficient to electrolytically deposit and immobilize said enzyme on said matrix to form a biologically active composite membrane.

2. The process of claim 1 wherein said biologically active composite membrane has a biological activity of at least about 0.001 International Units per cubic centimeter of membrane.

3. The process of claim 1 wherein said matrix has been formed by compacting and sintering a refractory oxide powder.

4. The process of claim 1 wherein said matrix has a porosity in the range of about 10 percent to about 80 percent and an average pore diameter in the range of about 0.01 to 10 microns.

5. The process of claim 1 wherein said matrix has a porosity in the range of about 15 percent to 50 percent.

6. The process of claim 1 wherein said matrix has an average pore diameter in the range of about 0.01 to about 2 microns.

7. The process of claim 1 wherein said aqueous dispersion of enzyme contains said enzyme in the proportion of $1 \times 10^{-5}\%$ to about 10 percent by weight of said dispersion.

8. The process of claim 3 wherein said refractory oxide powder is alumina.

9. The membrane formed by the process of claim 1.

10. The membrane formed by the process of claim 8.

* * * * *